(12) United States Patent
Zhang et al.

(10) Patent No.: US 11,196,854 B2
(45) Date of Patent: Dec. 7, 2021

(54) ELECTRONIC DEVICE

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: SHENZHEN HEYTAP TECHNOLOGY CORP., LTD., Guangdong (CN)

(*) Notice: Subject to any disclaimer, the term of this patent is extended or adjusted under 35 U.S.C. 154(b) by 0 days.

(21) Appl. No.: 16/846,347

(22) Filed: Apr. 12, 2020

(65) Prior Publication Data
US 2020/0244795 A1 Jul. 30, 2020

Related U.S. Application Data

(63) Continuation of application No. PCT/CN2018/115454, filed on Nov. 14, 2018.

(30) Foreign Application Priority Data

Nov. 22, 2017 (CN) .......................... 201711176948.2

(51) Int. Cl.
H04M 1/72454 (2021.01)
G09G 3/34 (2006.01)
G09G 5/10 (2006.01)

(52) U.S. Cl.
CPC ...... H04M 1/72454 (2021.01); G09G 3/3406 (2013.01); G09G 5/10 (2013.01); G09G 2320/0626 (2013.01); G09G 2360/144 (2013.01); H04M 2250/12 (2013.01)

(58) Field of Classification Search
CPC ................................................ H04M 1/72454
See application file for complete search history.

(56) References Cited

U.S. PATENT DOCUMENTS 7,450,161 B1 * 11/2008 Feng .................... H04N 5/3415
348/224.1
10,007,929 B1 * 6/2018 Koo .................... H04B 10/116
2009/0262052 A1 10/2009 Yang
2012/0270610 A1 10/2012 Chang et al.
(Continued)

FOREIGN PATENT DOCUMENTS

CN 201004666 1/2008
CN 101135792 3/2008
(Continued)

OTHER PUBLICATIONS

SIPO, Decision of Rejection for CN Application No. 201711176948. 2, dated Mar. 13, 2020.
(Continued)

Primary Examiner — Hsinchun Liao
(74) Attorney, Agent, or Firm — Perkins Coie LLP

(57) ABSTRACT

The embodiments of the disclosure provide an electronic device, which comprises a casing, a display screen, an ambient light sensor disposed at one side of the display screen; the display screen and the ambient light sensor are both installed in the casing; a side portion of the casing is provided with a light sensing hole, and the ambient light sensor perceives external ambient light signals input from the light sensing hole.

18 Claims, 7 Drawing Sheets

(56) References Cited

U.S. PATENT DOCUMENTS

2013/0048837 A1 2/2013 Pope et al.
2013/0341650 A1 12/2013 Peng

FOREIGN PATENT DOCUMENTS

| | | |
|---|---|---|
| CN | 201414174 | 2/2010 |
| CN | 201854314 | 6/2011 |
| CN | 202394502 | 8/2012 |
| CN | 104347038 | 2/2015 |
| CN | 103066087 | 3/2016 |
| CN | 103310719 | 5/2016 |
| CN | 106101322 | 11/2016 |
| CN | 206370852 | 8/2017 |
| CN | 107250744 | 10/2017 |
| CN | 107886927 | 4/2018 |
| EP | 3438783 | 2/2019 |
| WO | 2017171400 | 10/2017 |

OTHER PUBLICATIONS

WIPO, ISR for PCT/CN2018/115454, dated Feb. 20, 2019.
SIPO, First Office Action for CN Application No. 201711176948.2, dated Apr. 22, 2019.
SIPO, Second Office Action for CN Application No. 201711176948.2, dated Nov. 18, 2019.
EPO, Office Action for EP Application No. 18880315.9, dated Jun. 29, 2020.
Examination Report for IN Application No. 202017018163, dated May 26, 2021.
SIPO, Notification to Grant Patent Right for Invention issued for CN Application No. 201711176948.2, dated Jul. 21, 2021.

\* cited by examiner

ELECTRONIC DEVICE

CROSS REFERENCE TO RELATED APPLICATIONS

This application is a continuation of International Application No. PCT/CN2018/115454, filed Nov. 14, 2018, which claims priority to Chinese Patent Application No. 201711176948.2, filed Nov. 22, 2017, the entire disclosures of which are incorporated herein by reference.

TECHNICAL FIELD

The present disclosure relates to the field of electronic apparatus technologies, and more particularly, to an electronic device.

BACKGROUND

With the development of communication technology, electronic devices such as smart phones are becoming more and more popular. The electronic device is generally provided with an ambient light sensor, the electronic device can detect external ambient light signals by the ambient light sensor, thereby controlling a brightness of a display screen thereof.

SUMMARY

The disclosure provides an electronic device, which can improve an accuracy of light sensing for an ambient light sensor.

An embodiment of the disclosure provides an electronic device, including a casing, a display screen, and an ambient light sensor disposed at one side of the display screen; the display screen and the ambient light sensor are both installed in the casing; a side portion of the casing is provided with a light sensing hole; the ambient light sensor receives external ambient light signals entering from the light sensing hole.

BRIEF DESCRIPTION OF THE DRAWINGS

In order to explain the technical solutions in the embodiments of the disclosure more clearly, the drawings used in the description of the embodiments are briefly introduced below. Obviously, the drawings in the following description are just some embodiments of the disclosure. For those skilled in the art, other drawings can be obtained based on these drawings without creative work.

DETAILED DESCRIPTION

Figure 1:
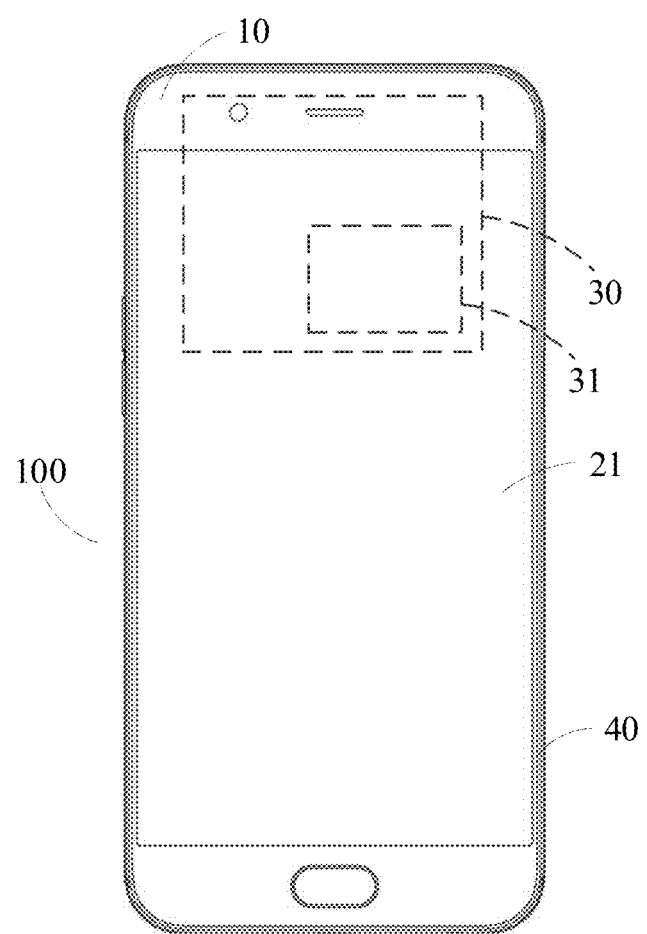
FIG. 1 is a schematic structural diagram of an electronic device according to an embodiment of the disclosure.

The technical solutions in the embodiments of the disclosure will be clearly and completely described below with reference to the drawings in the embodiments of the disclosure. Obviously, the described embodiments are only some embodiments but not all embodiments of the disclosure. Based on these embodiments, all other embodiments, obtained by those skilled in the art without creative work, should fall into the protection scope of the disclosure.

The following disclosure provides many different embodiments or examples for implementing different structures of the disclosure. To simplify the disclosure, the components and settings of specific examples are described below. Of course, they are merely examples and are not intended to limit the disclosure. An embodiment of the disclosure provides an electronic device, including a casing, a display screen, and an ambient light sensor disposed on one side of the display screen. The display screen and the ambient light sensor are both installed in the casing. A side portion of the casing is provided with a light sensing hole, and the ambient light sensor perceives external ambient light signals input from the light sensing hole.

In some embodiments, the ambient light sensor has a sensitive surface, which faces the light sensing hole.

In some embodiments, the electronic device further includes a light-converging structure installed in the casing. The light-converging structure is disposed between the light sensing hole and the ambient light sensor, and the external ambient light signals input from the light sensing hole passes through the light-converging structure and enters the sensitive surface of the ambient light sensor.

In some embodiments, the light-converging structure includes an optical lens.

In some embodiments, the optical lens has a convex surface facing the sensitive surface of the environmental sensor.

In some embodiments, the electronic device further includes a reflective structure installed in the casing, the reflective structure is disposed between the light sensing hole and the ambient light sensor, and the external ambient light signals input from the light sensing hole are reflected by the reflective structure and then enters into the ambient light sensor.

In some embodiments, the light sensing hole include one of a headphone jack, a USB jack, and a speaker outlet.

In some embodiments, a diameter of the light sensing hole is 2 to 4 mm.

In some embodiments, the electronic device further includes a signal transmitter and a signal receiver both disposed on one side of the display screen. The signal transmitter transmits a detection signal, the detection signal is transmitted to the outside through the display screen, the detection signal is reflected by an external object thereby to form a reflected signal, and the reflected signal enters into the signal receiver through the display screen.

In some embodiments, the signal transmitter has a signal transmitting surface facing the display screen; the signal receiver has a signal receiving surface facing the display screen.

In some embodiments, the light sensing surface of the ambient light sensor is perpendicular to the signal transmitting surface and the signal receiving surface, respectively.

In some embodiments, the light sensing hole includes a circular hole, a square hole, or an oval hole.

In some embodiments, the optical lens has a first convex surface and a second convex surface; the first convex surface faces the sensitive surface of the ambient light sensor; and the second convex surface faces the light sensing hole.

In some embodiments, the reflective structure includes a reflective lens.

In some embodiments, the signal transmitter is an infrared transmitter, and the signal receiver is an infrared receiver.

In some embodiments, a side of the display screen facing the ambient light sensor is provided with a light shielding layer, and an opening is provided in the light shielding layer; the signal transmitter and the signal receiver are located below the opening.

In some embodiments, a diameter of the opening of the light shielding layer is between 2 and 4 millimeters.

In some embodiments, a distance between the signal transmitter and the signal receiver is between 2 and 14 millimeters.

In some embodiments, a distance between a geometric center of the signal transmitter and a geometric center of the signal receiver is 2 millimeters to 14 millimeters.

In some embodiments, the ambient light sensor, the signal transmitter, and the signal receiver are packaged into a chip.

An embodiment of the disclosure provides an electronic apparatus, and the electronic apparatus may include an electronic device and the like.

In some embodiments, an electronic device is provided. The electronic device may be a smart phone, a tablet computer, or the like. Referring to FIG. 1, an electronic device 100 includes a cover plate 10, a sensor assembly 20, a display screen 21, a circuit board 30, and a casing 40.

The cover plate 10 is mounted on the display screen 21 to cover the display screen 21. The cover plate 10 may be a transparent glass cover plate. In some embodiments, the cover plate 10 may be a glass cover plate made of materials such as sapphire and the like.

The display screen 21 is mounted on the casing 40 to form a display surface 210 of the electronic device 100. The display screen 21 serves as a front casing of the electronic device 100, the front casing and the casing 40 cooperatively forms a receiving space 101 for receiving other electronic components of the electronic device 100. The receiving space 101 is enclosed. Meanwhile, the display screen 21 forms the display surface 210 of the electronic device 100 which is configured for displaying information such as images and text.

The circuit board 30 is installed inside the casing 40 to house the circuit board 30 in the receiving space 101. The circuit board 30 may be a main board of the electronic device 100, and may has a ground point provided on it to achieve grounding of the circuit board 30. Functional components such as a camera, a processor 301, and a sensor may be integrated on the circuit board 30. Meanwhile, the sensor assembly 20 may be electrically connected to the circuit board 30.

In the description of this application, it should be noted that the terms "install", "connect", and "couple" should be understood in a broad sense unless explicitly stated and limited otherwise. For example, may be connected fixedly, detachably, or integrally; may be connected mechanically, electrically, or communicably; may be connected directly, or indirectly through an intermediate medium; may be an internal communication of two elements or an interaction relationship of two elements. For those of ordinary skill in the art, the specific meanings of the above terms in this disclosure can be understood according to specific situations.

In some embodiments, a display control circuit is disposed on the circuit board 30. The display control circuit outputs electrical signals to the display screen 21, thereby to control the display screen 21 to display information. That is, the processor 301 is communicated with the display screen 21 via the circuit board 30.

The casing 40 is configured to form an exterior of the electronic device 100. The material of the casing 40 may be plastic or metal. The casing 40 may be integrally formed.

Figure 2:
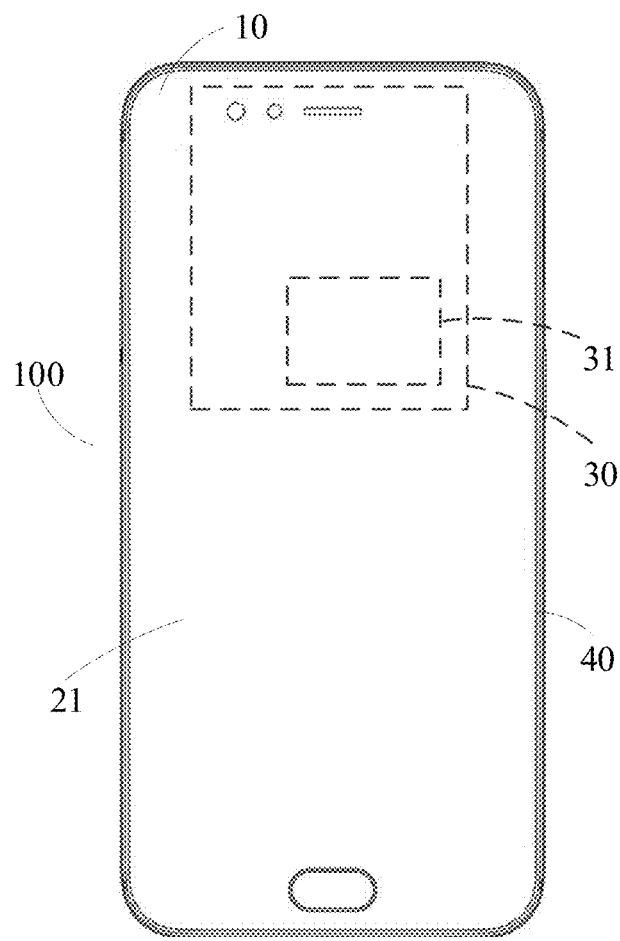
FIG. 2 is another schematic structural diagram of the electronic device according to an embodiment of the disclosure.

In some embodiments, the display screen 21 may be displayed in full screen. That is, the display screen 21 almost includes only a display area and does not include a non-display area, as shown in FIG. 2.

Figure 3:
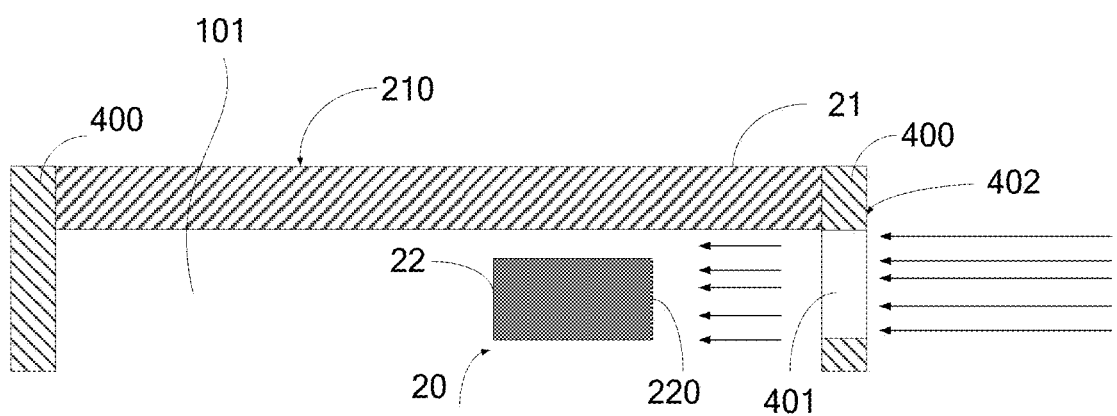
FIG. 3 is a schematic diagram showing a first structure of a sensor assembly according to an embodiment of the disclosure.

In some embodiments, as illustrated in FIG. 3, the sensor assembly 20 includes an ambient light sensor 22, and the ambient light sensor 22 is disposed at one side of the display screen 21.

It can be understood that the ambient light sensor 22 is disposed at an inner side of the display screen 21. The inner side refers to a side of the display screen 21 that is invisible when viewed from the outside of the electronic device 100. That is, the ambient light sensor 22 is located inside the electronic device 100.

The ambient light sensor 22 is configured to detect or sense external ambient light signals to form sensing information, and transmit the sensing information such as the intensity of the ambient light to the processor 31 of the electronic device 100, so the processor 31 controls the brightness of the display screen 21 and the like according to the sensing information.

For example, when the ambient light sensor 22 detects that the external ambient light signals are becoming weak, the processor 31 may increase the brightness of the display screen 21, and when the ambient light sensor 22 detects that the external ambient light signals are becoming strong, the processor 31 may decrease the brightness of the display screen 21.

As illustrated in FIG. 3, the ambient light sensor 22 is disposed inside the display screen 21, that is, disposed below the display screen 21.

The casing 40 includes a side frame, i.e., a side portion 400, the side portion 400 is coupled to the display screen 21 and is substantially perpendicular to the display screen 21.

The side portion 400 of the casing 40 is provided with a light sensing hole 401, and external ambient light signals can enter into the ambient light sensor 22 from the light sensing hole 401. The light sensing hole 401 is exposed from an outer surface 402 of the side portion 400.

In some embodiments, the casing 40 may be rounded rectangular in shape, and the side portion 400 may be a long side portion of the casing 40 or a short side portion of the casing 40, wherein the long side portion is a side portion of the casing 40 having a long side, and the short side portion is a side portion of the casing 40 having a short side.

In the embodiments of the disclosure, the ambient light sensor 22 can sense the external ambient light signals through the light sensing hole 401 of the side portion 400. Compared with the current solution of sensing the external ambient light signals through the display screen 21, it can be avoided that the brightness of the display screen 21 itself affects the detection or sensation of the external ambient light signals. As such, an accurate light sensing information can be obtained, a light sensing accuracy of the ambient light sensor 22 is improved, and further a controlling accuracy of the brightness of the display screen 21 is improved.

In some embodiments, the light sensing hole 401 may be an opening provided on the side portion of the casing 40 of the electronic device 100. For example, the light sensing hole 401 may be one of the openings provided on the side portion of the casing 40, including a headphone jack, a USB jack, a sound outlet of a speaker, and the like.

For example, when the light sensing hole 401 is the USB jack, external ambient light signals can enter the electronic device 100 through the USB jack and then are sensed by the ambient light sensor 22. The ambient light sensor 22 can send sensing information to the processor 31, and the processor 31 controls the brightness of the display screen 21 according to the sensing information, such as reducing the brightness or increasing the brightness.

In the disclosure, the electronic device 100 can define more than one light sensing holes 401, the number of the light sensing holes 401 may be set according to actual requirements. For example, in some embodiments, the number of the light sensing holes 401 may be two, three, or the like.

In the disclosure, the larger the light sensing hole 401 is, the better the light sensing effect of the ambient light sensor 22 is, and the more accurate the light sensing is. Subject to the size limitation of the electronic device 100, in some embodiments, when the diameter of the light sensing hole 401 is between 2 and 4 millimeters, the electronic device 100 has the best effect of light sensing.

In some embodiments, the shape of the light sensing hole 401 may be various, for example, the light sensing hole 401 may be a circular hole, a square hole, an oval hole, or other holes.

In some embodiments, referring to FIG. 3, the ambient light sensor 22 may have a sensitive surface 220. The sensitive surface 220 facing the light sensing hole 401, to improve the light sensing effect or the accuracy of the ambient light sensor. For example, the sensitive surface 220 may face the light sensing hole 401 directly. The sensitive surface 220 is substantially perpendicular to the display surface 210 of the display screen 21 and parallel to the outer surface 402 of the side portion 400.

The external ambient light signals can be incident on the sensitive surface 220 through the light sensing hole 401 and thus can be sensed by the ambient light sensor 22.

Figure 4:
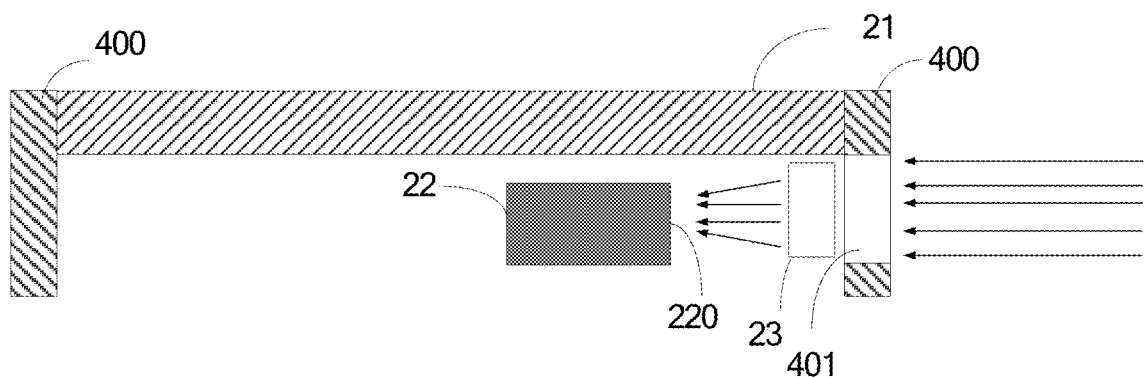
FIG. 4 is a schematic diagram showing a second structure of a sensor assembly according to an embodiment of the disclosure.

In some embodiments, in order to improve the light sensing effect or the accuracy of the ambient light sensor, a light-converging structure 23 may be further provided in the casing 40 as illustrated in FIG. 4. The light-converging structure 23 is disposed between the light sensing hole 401 and the ambient light sensors 22, the external ambient light signals input from the light sensing hole 401 pass through the light-converging structure 23 and then are incident on the sensitive surface 220 of the ambient light sensor 22.

The function of the light-converging structure 23 is to converge external ambient light signals, so that more or stronger external ambient light signals can be sensed by the ambient light sensor 22.

In some embodiments, the light-converging structure 23 may include an optical structure such as an optical lens 230.

Figure 5:
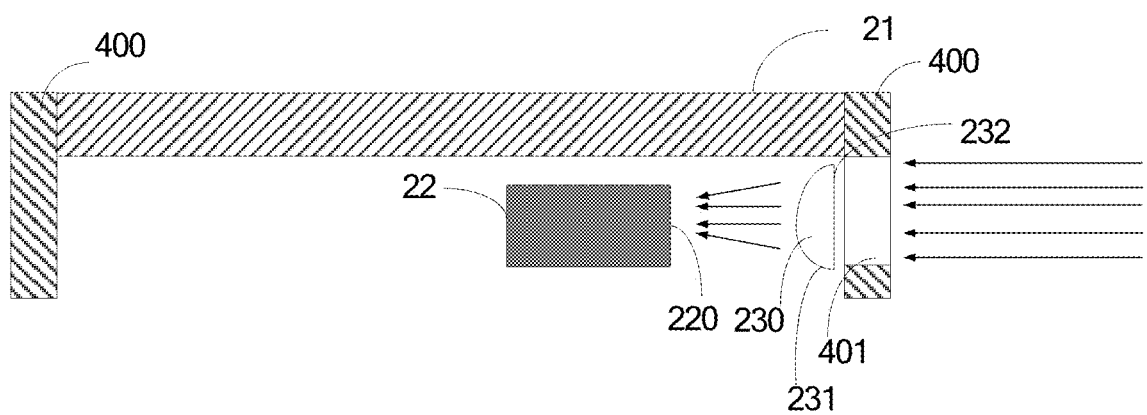
FIG. 5 is a schematic diagram showing a third structure of a sensor assembly according to an embodiment of the disclosure.

The optical lens 230 may be a transparent lens made of light-transmitting materials. For example, the optical lens 230 may be a transparent glass lens. In some embodiments, as illustrated in FIG. 5, the optical lens 230 has a convex surface 231 and a plane 232, wherein the convex surface 231 faces the sensitive surface 220 of the ambient light sensor 22, and the plane 222 faces the light sensing hole 401 of the side portion 400.

It can be understood that the convex surface 231 of the optical lens 230 faces the sensitive surface 220, so that the optical lens 230 can play a role of converging light. More external ambient light signals can be transmitted to the ambient light sensor 22, and the diffraction or scattering of the ambient light signals inside the electronic device 100 can be reduced, so as to improve the utilization rate of the external ambient light signals and improve the detecting/sensing accuracy of the ambient light sensor 22.

Figure 6:
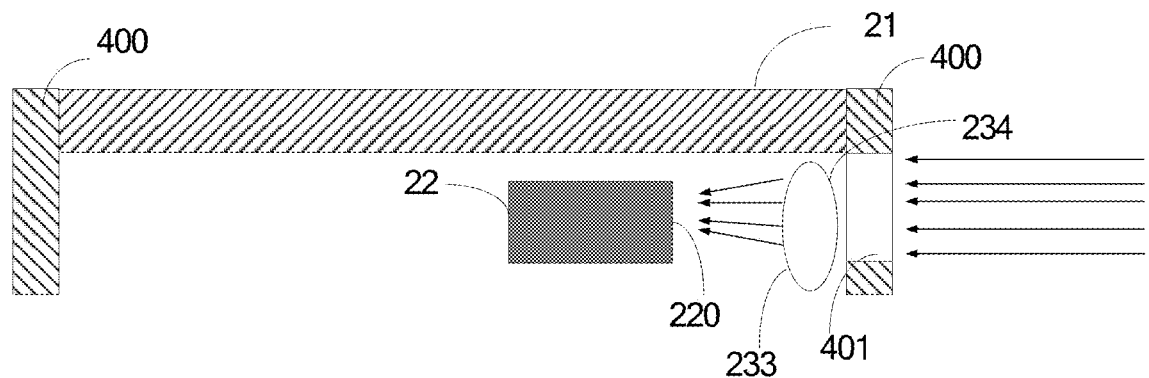
FIG. 6 is a schematic diagram showing a fourth structure of a sensor assembly according to an embodiment of the disclosure.

In some embodiments, as illustrated in FIG. 6, the optical lens 230 has a first convex surface 233 and a second convex surface 234. That is, the optical lens 230 is an oval lens, whose both sides are convex surfaces. The first convex surface 233 faces the sensitive surface 220 of the ambient light sensor 22, and the second convex surface 234 faces the light sensing hole 401 of the side portion 400.

It can be understood that when both sides of the optical lens 230 are convex, compared to the structure of the optical lens whose one surface is convex and the other surface is flat, the light-converging effect of the optical lens 230 can be improved, the diffraction or scattering of the ambient light signals inside the electronic device 100 can be reduced, more external signals are allowed to enter the inside of the casing 40, thereby further improving the utilization rate of the ambient light signals and improving the detecting/sensing accuracy of the ambient light sensor 22.

Figure 7:
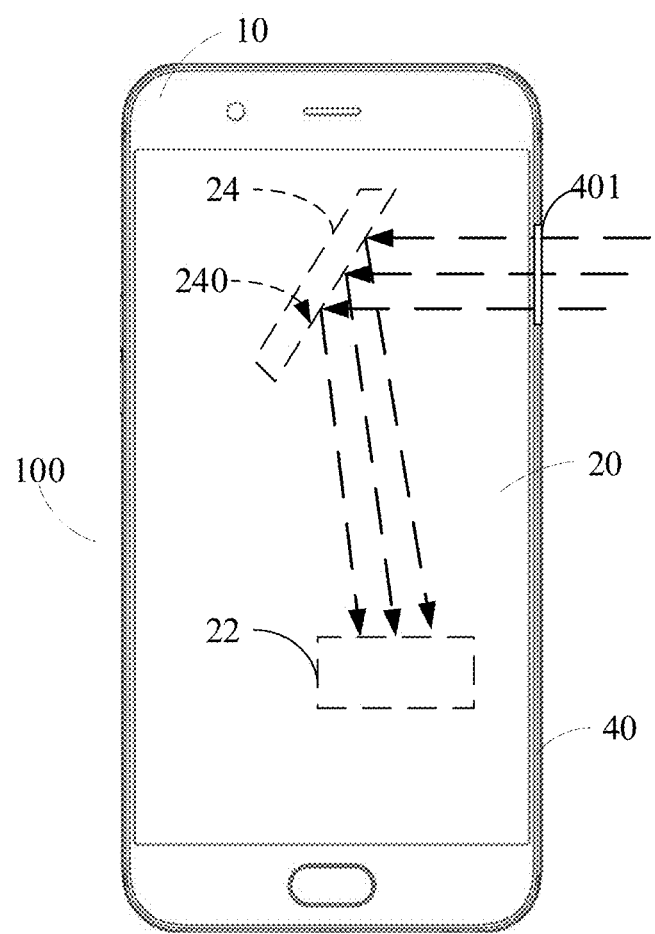
FIG. 7 is a schematic diagram showing a sensor assembly receiving ambient light signals according to an embodiment of the disclosure.

In some embodiments, in order to enable the ambient light sensor 22 to be freely disposed inside the casing 40, a reflective structure 24 may also be disposed or installed in the casing 40, as illustrated in FIG. 7. The reflective structure 24 is disposed between the light sensing hole 401 and the ambient light sensor 22, the ambient light signals input from the light sensing hole 401 are reflected by a reflective surface 240 of the reflective structure 24 and then incident on the ambient light sensor 22. The reflective surface 240 is opposite to the light sensing hole 401 and the ambient light sensor 22. Specifically, the reflective surface 240 is tilted relative to the outer surface 402 of the side portion 400 and the sensitive surface 220 of the ambient light sensor 22.

For example, the ambient light sensor 22 may be disposed adjacent to the bottom of the casing 40, is away from and does not face the light sensing hole 401. The reflective structure 24, which is adjacent to the top of the casing 40, is located between the light sensing hole 401 and the ambient light sensor 22, and is tilted relative to the light sensing hole 401 and the ambient light sensor 22, may reflect the ambient light signals input from the light sensing hole 401 to the ambient light sensor 22. At this time, the ambient light sensor 22, which is adjacent to the bottom of the casing 40, can sense the ambient light signals input from the light sensing hole 401 which is at the side portion of the casing 40.

The reflective structure 24 may include a lens capable of reflecting lights, such as a reflective lens.

Because the ambient light sensor 22 is set inside of the display screen 21, when the display is on, the brightness of the display screen 21 itself may affect the detecting of light perception. At this time, the light perception value detected when the display screen is on is actually greater than the real light perception value, which results a poor accuracy of light perception.

In the embodiment of the disclosure, the light sensing hole 401 is provided at the side portion 400 of the casing 40, so that the ambient light sensor 22 can sense external ambient light signals through the light sensing hole 401, thereby preventing the brightness of the display screen 21 from effecting the sensing or detecting, improving the accuracy of light perception of the ambient light sensor 22, and improving the accuracy of controlling the brightness of the display screen 21.

Figure 8:
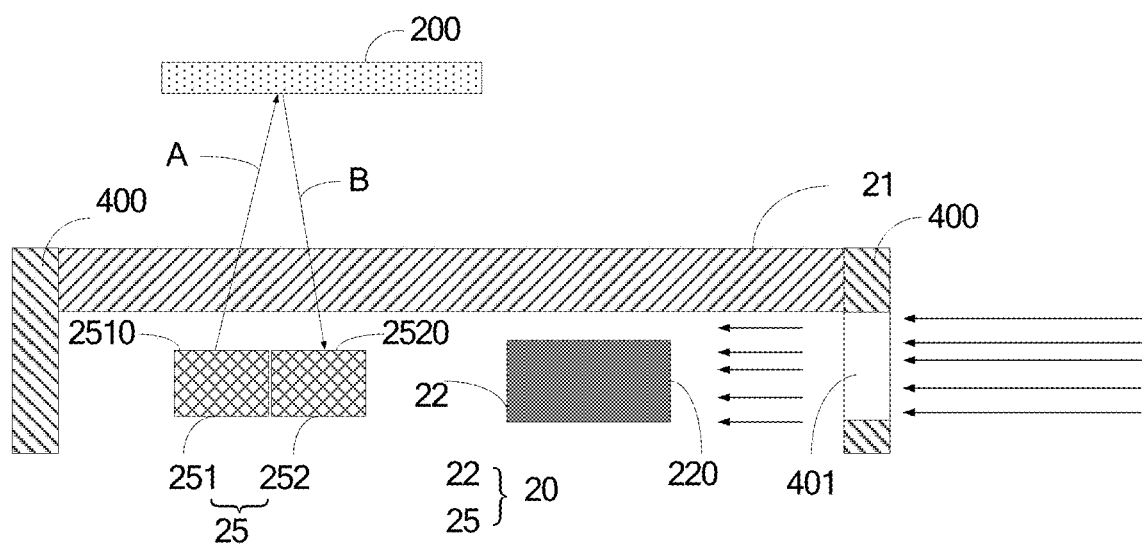
FIG. 8 is a schematic diagram showing a fifth structure of a sensor assembly according to an embodiment of the disclosure.

In some embodiments, referring to FIG. 8, the sensor assembly 20 may further include a proximity sensor 25, and the proximity sensor 25 and the ambient light sensor 22 are disposed on one side of the display screen 21, such as an inner side of the display screen 21. The proximity sensor 25 can detect a distance between the electronic device 100 and an external object, so that the electronic device 100 can control the state of the display screen 21 based on the distance, for examples, control the screen on or off.

For example, when the electronic device 100 is communicating, the electronic device 100 can detect the distance between the electronic device 100 and an external object through the proximity sensor 25, and control the display screen 21 to be turned off or lit up based on the distance. For instances, when it is leaving away from the electronic device 100, the display screen 21 is lit up; when it is approaching the electronic device 100, the display screen 21 is turned off.

In some embodiments, referring to FIG. 8, the proximity sensor 25 includes a signal transmitter 251 and a signal receiver 252. The signal transmitter 251 is configured to transmit a detection signal A to the outside. The detection signal A is transmitted to the outside through the display screen 21. When the detection signal A contacts an external object 200 (for example, a user's face), a reflected signal B is generated. The reflected signal B enters the signal receiver 252 through the display screen 21.

After the signal receiver 252 receives the reflected signal B, it can output the received signal to a processor of the electronic device 100 for processing, so as to control the display screen of the electronic device 100 to be turned off or lit up.

In some embodiments, referring to FIG. 8, the signal transmitter 251 has a signal transmitting surface 2510, the signal transmitting surface 2510 faces the display screen 21; the signal receiver 252 has a signal receiving surface 2520, and the signal receiving surface 2520 faces the display screen 21.

The signal transmitter 251 transmits the detection signal A to the outside through the signal transmitting surface 2510. The detection signal A is transmitted to the outside through the display screen 21. When the detection signal A is blocked by the external object 200 (for example, a user's face), the reflected signal B is generated. The reflected signal B enters the signal receiving surface 2520 of the signal receiver 252 through the display screen 21.

Figure 9:
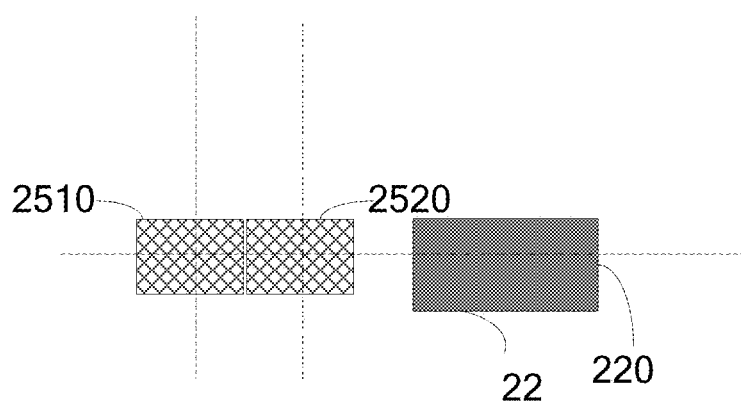
FIG. 9 is a schematic diagram showing a first arrangement of components of a sensor assembly according to an embodiment of the disclosure.

In some embodiments, in order to reduce the mutual interference between the proximity sensor 25 and the ambient light sensor 22, referring to FIG. 9, the sensitive surface 220 of the ambient light sensor 22 is perpendicular to or substantially perpendicular to both of the signal transmitting surface 2510 and the signal receiving surface 2520.

In some embodiments, the signal transmitter 251 is an infrared transmitter for transmitting infrared rays. The signal receiver 252 is an infrared receiver for receiving infrared rays.

It is noted that the ambient light sensor 22, the light-converging structure 23, the reflective structure 24, the proximity sensor 25 each are accommodated in the receiving space 101 of the electronic device 100.

Figure 10:
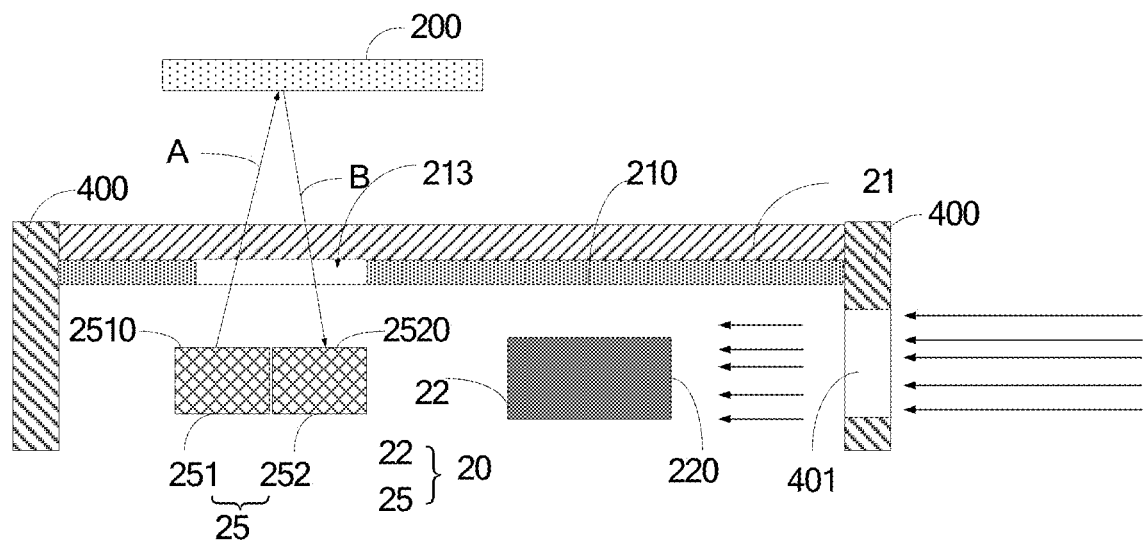
FIG. 10 is a schematic diagram showing a sixth structure of a sensor assembly according to an embodiment of the disclosure.

In some embodiments, referring to FIG. 10, a side of the display screen 21 facing the ambient light sensor 22 is provided with a light shielding layer 210. The light shielding layer 210 defines an opening 213, and the signal transmitter 251 and the signal receiver 252 are located below the opening 213, which allows signals such as optical signals and acoustic signals to pass through.

In the description of the disclosure, it should be understood that the terms indicating orientations or positional relationships, such as "center", "longitudinal", "transverse", "length", "width", "thickness", "upper", "lower", "front", "back", "left", "right", "vertical", "horizontal", "top", "bottom", "inside", "outside", are based on the orientations or positional relationships illustrated in the drawings, and just for the convenience of describing the disclosure and simplifying the description, rather than indicating or implying that the device or element referred to must have a particular orientation, be constructed and operate in a particular orientation, so it cannot be understood as a limitation of the disclosure.

The signal transmitter 251 is configured to transmit a detection signal A to the outside. The detection signal A is transmitted to the outside through the opening 213 and the display screen 21. When the detection signal A is in contact with an external object 200 (for example, a user's face), a reflected signal B is generated. The reflected signal B is reflected into the signal receiver 252 through the opening 213 and the display screen 21.

In some embodiments, the light shielding layer 210 may be a thin layer structure made of materials such as foam or steel sheet.

In some embodiments, the opening 213 is circular, whose diameter is 2 to 4 mm. In some other embodiments, the opening 213 may be a hole with other shapes such as square, oval, and so on.

Figure 11:
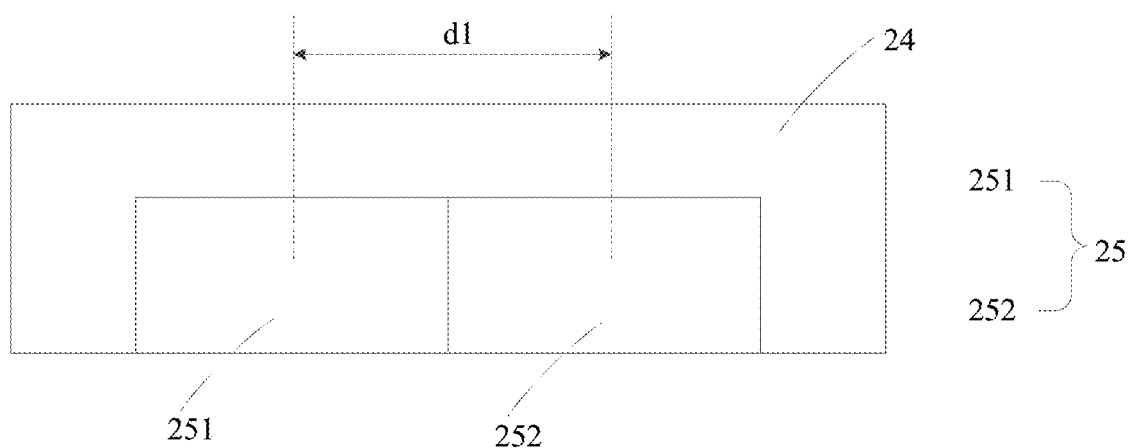
FIG. 11 is a schematic diagram showing a second arrangement of components of a sensor assembly according to an embodiment of the disclosure.

In some embodiments, as illustrated in FIG. 11, the proximity sensor 25 includes the signal transmitter 251 and the signal receiver 252, wherein the signal transmitter 251 and the signal receiver 252 are disposed adjacent to each other. A distance d1 between a geometric center of the signal transmitter 251 and a geometric center of the signal receiver 252 is 2 to 14 mm.

In some embodiments, the signal transmitter 251 and the signal receiver 252 are packaged as a first chip 24. By arranging the signal transmitter 251 and the signal receiver 252 adjacent to each other, the volume of the first chip 24 is reduced.

Figure 12:
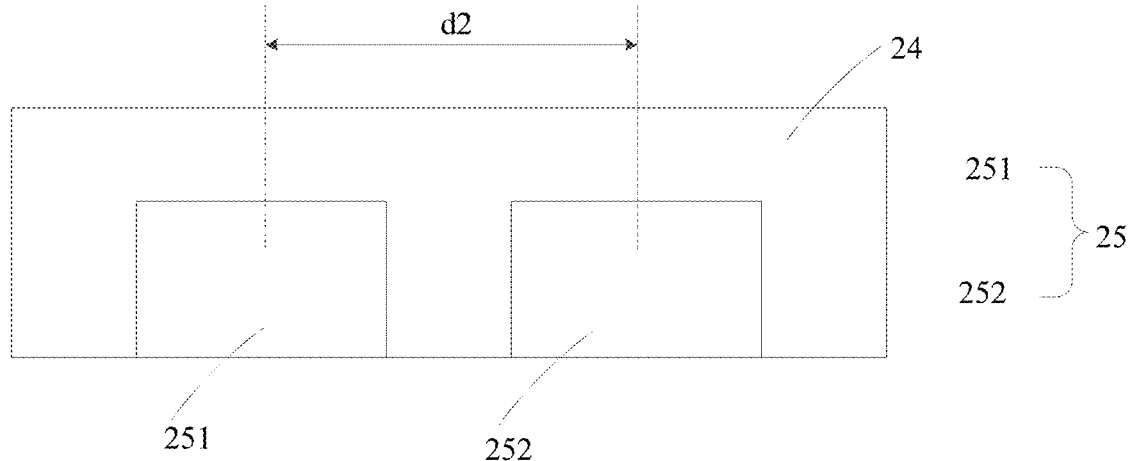
FIG. 12 is a schematic diagram showing a third arrangement of components of a sensor assembly according to an embodiment of the disclosure.

In some embodiments, as illustrated in FIG. 12, the proximity sensor 25 includes the signal transmitter 251 and the signal receiver 252, wherein the signal transmitter 251 and the signal receiver 252 are spaced from each other. A distance d2 between the signal transmitter 251 and the signal receiver 252 is 2 to 14 mm. It can be understood that the above distance is the distance between the geometric center of the signal transmitter 251 and the geometric center of the signal receiver 232. By arranging the signal transmitter 251 and the signal receiver 252 spaced apart from each other, the isolation between the signal transmitter 251 and the signal receiver 252 can be improved, and the influence of the signals transmitted by the signal transmitter 251 on the signal receiver 252 can be reduced.

In some embodiments, the above-mentioned signal transmitter 251 and the signal receiver 252 are packaged as the first chip 24.

Figure 13:
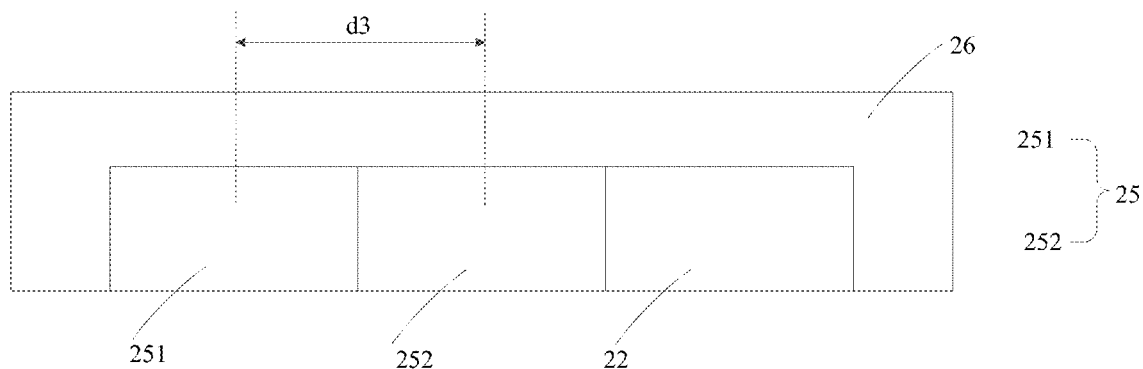
FIG. 13 is a schematic diagram showing a fourth arrangement of components of a sensor assembly according to an embodiment of the disclosure.

In some embodiments, as illustrated in FIG. 13, the ambient light sensor 22 and the proximity sensor 25 are integrated in a second chip 26. The sensor assembly 20 includes the signal transmitter 251, the signal receiver 252, and the ambient light sensor 22. The ambient light sensor 22 is configured to detect the ambient light intensity. The electronic device 100 can adjust the brightness of the display screen 21 according to the ambient light intensity detected by the ambient light sensor 22.

The signal transmitter 251, the signal receiver 252, and the ambient light sensor 22 are disposed adjacent to each other. A distance d3 between a geometric center of the signal transmitter 251 and a geometric center of the signal receiver 252 is 2 to 14 mm.

Figure 14:
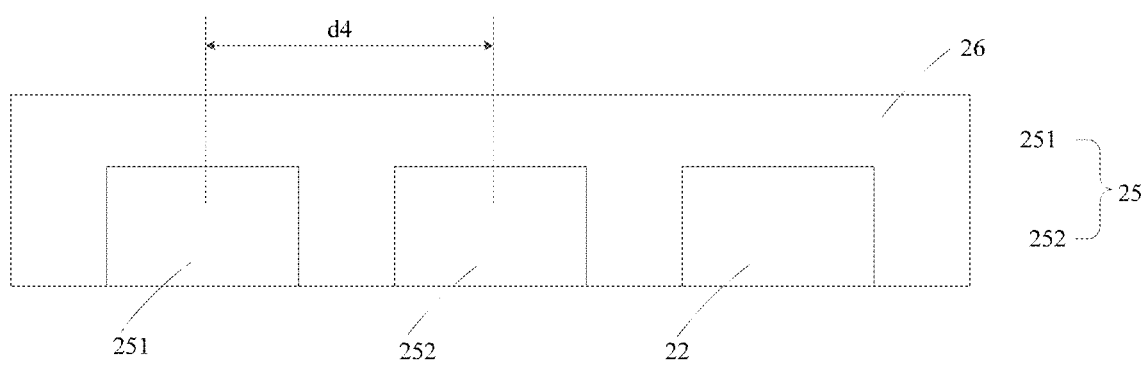
FIG. 14 is a schematic diagram showing a fifth arrangement of components of a sensor assembly according to an embodiment of the disclosure.

In some embodiments, as illustrated in FIG. 14, the second chip 26 includes the signal transmitter 251, the signal receiver 252, and the ambient light sensor 22. The ambient light sensor 22 is configured to detect the ambient light intensity. The electronic device 100 can adjust the brightness of the display screen 21 according to the ambient light intensity detected by the ambient light sensor 22.

The signal transmitter 251, the signal receiver 252, and the ambient light sensor 22 are disposed apart from each other. A distance d4 between the signal transmitter 251 and the signal receiver 252 is 2 to 14 mm. It can be understood that the above distance is the distance between a geometric center of the signal transmitter 251 and a geometric center of the signal receiver 252. The signal transmitter 251, the signal receiver 252, and the ambient light sensor 22 are spaced from each other to improve the isolation between the signal transmitter 251, the signal receiver 252, and the ambient light sensor 22, and to reduce the influence of the signals transmitted by the signal transmitter 251 on the signal receiver 252 and the ambient light sensor 22.

The terms "first" and "second" are only used for descriptive purposes, and cannot be understood as indicating or implying relative importance or the number of technical features. Therefore, the features defined as "first" and "second" may explicitly or implicitly include one or more of the features. In the description of the disclosure, the meaning of "a plurality" is two or more, unless specifically defined otherwise.

The electronic device provided in the embodiments of the disclosure have been described in detail above. Specific examples are used herein to explain the principles and implementation of the disclosure. The descriptions of the above embodiments are only used to help to understand the disclosure. At the same time, for those skilled in the art, according to the concept of the disclosure, there may be modifications in the specific embodiments and in the scope of the disclosure. In summary, the content of this description should not be construed as limitations of the disclosure.

What is claimed is:

1. An electronic device, comprising:
a casing, a display screen, an ambient light sensor disposed at one side of the display screen, the display screen and the ambient light sensor being both installed in the casing;
a side portion of the casing provided with a light sensing hole, wherein the ambient light sensor is configured to detect external ambient light signals input from the light sensing hole to form sensing information, and the brightness of the display screen is controlled according to the sensing information; and
a signal transmitter and a signal receiver, both disposed at one side of the display screen, wherein the signal transmitter transmits a detection signal, the detection signal is transmitted to the outside through the display screen, the detection signal is reflected by an external object thereby to form a reflected signal, and the reflected signal enters into the signal receiver through the display screen;
wherein the ambient light sensor, the signal transmitter, and the signal receiver are packaged to form a chip.

2. The electronic device as claimed in claim 1, wherein the ambient light sensor has a sensitive surface facing the light sensing hole.

3. The electronic device as claimed in claim 2, wherein the electronic device further comprises a light-converging structure installed in the casing, the light-converging structure is disposed between the light sensing hole and the ambient light sensor, and the external ambient light signals input from the light sensing hole passes through the light-converging structure and are incident on the sensitive surface of the ambient light sensor.

4. The electronic device as claimed in claim 3, wherein the light-converging structure comprises an optical lens, and the optical lens has a convex surface facing the sensitive surface of the ambient light sensor.

5. The electronic device as claimed in claim 4, wherein the optical lens has a first convex surface and a second convex surface; the first convex surface faces the sensitive surface of the ambient light sensor; and the second convex surface faces the light sensing hole.

6. The electronic device as claimed in claim 1, wherein the electronic device further comprises a reflective structure installed in the casing, the reflective structure is disposed between the light sensing hole and the ambient light sensor, and the external ambient light signals input from the light sensing hole are reflected by the reflective structure and then enter the ambient light sensor.

7. The electronic device as claimed in claim 6, wherein the reflective structure comprises a reflective lens.

8. The electronic device as claimed in claim 1, wherein the light sensing hole is selected from the group consisting of a headphone jack, a USB jack, and a speaker outlet.

9. The electronic device as claimed in claim 1, wherein a diameter of the light sensing hole is 2 millimeters to 4 millimeters.

10. The electronic device as claimed in claim 1, wherein the signal transmitter has a signal transmitting surface facing the display screen; the signal receiver has a signal receiving surface facing the display screen.

11. The electronic device as claimed in claim 10, wherein the signal transmitting surface and the signal receiving surface both are perpendicular to the light sensing surface of the ambient light sensor.

12. The electronic device as claimed in claim 1, wherein the signal transmitter is an infrared transmitter, and the signal receiver is an infrared receiver.

13. The electronic device as claimed in claim 1, wherein a light shielding layer is provided at an inner side of the display screen facing the ambient light sensor, the light shielding layer defines an opening; the signal transmitter and the signal receiver are located below the opening.

14. The electronic device as claimed in claim 13, wherein a diameter of the opening of the light shielding layer is between 2 millimeters and 4 millimeters, a distance between a geometric center of the signal transmitter and a geometric center of the signal receiver is between 2 millimeters and 14 millimeters.

15. An electronic device, comprising:
a display screen;
a casing integrated with the display screen to define a receiving space, the casing comprising a side portion coupled to the display screen, the side portion defining a light sensing hole in communication with the receiving space;
an ambient light sensor received in the receiving space and facing the light sensing hole, the ambient light sensor perceiving ambient lights input from the light sensing hole to obtain sensing information;
a processor received in the receiving space and configured to communicate with both of the ambient light sensor and the display screen, the processor being configured to control the brightness of the display screen according to the sensing information; and
a signal transmitter and a signal receiver, both disposed at one side of the display screen, wherein the signal transmitter transmits a detection signal, the detection signal is transmitted to the outside through the display screen, the detection signal is reflected by an external object thereby to form a reflected signal, and the reflected signal enters into the signal receiver through the display screen;
wherein the ambient light sensor, the signal transmitter, and the signal receiver are packaged to form a chip.

16. The electronic device as claimed in claim 15, wherein the ambient light sensor comprises a sensitive surface facing the light sensing hole, the sensitive surface is perpendicular to a display surface of the display screen.

17. An electronic device, comprising:
a display screen;
a casing integrated with the display screen to define a receiving space, the casing comprising a side frame coupled to the display screen, the side frame defining a light sensing hole in communication with the receiving space;
a reflective structure received in the receiving space, opposite to the light sensing hole;
an ambient light sensor received in the receiving space and opposite to the reflective structure, the reflective structure reflecting ambient lights incident from the light sensing hole to the ambient light sensor, the ambient light sensor perceiving the ambient lights to form sensing information;
a processor received in the receiving space and configured to communicate with both of the ambient light sensor and the display screen, the processor receiving the sensing information and controlling the brightness of the display screen according to the sensing information; and
a signal transmitter and a signal receiver, both disposed at one side of the display screen, wherein the signal transmitter transmits a detection signal, the detection signal is transmitted to the outside through the display screen, the detection signal is reflected by an external object thereby to form a reflected signal, and the reflected signal enters into the signal receiver through the display screen;
wherein the ambient light sensor, the signal transmitter, and the signal receiver are packaged to form a chip.

18. The electronic device as claimed in claim 17, wherein the light sensing hole is exposed from an outer surface of the side frame, the outer surface of the side frame is perpendicular to a display surface of the display screen, a reflective surface of the reflective structure is tilted relative to both of the outer surface of the side frame and a sensitive surface of the ambient light sensor.

* * * * *